US009121122B2

(12) United States Patent
Son et al.

(10) Patent No.: US 9,121,122 B2
(45) Date of Patent: Sep. 1, 2015

(54) WASHING MACHINE AND CONTROL METHOD THEREOF

(75) Inventors: Young Bok Son, Changwon-si (KR); Ae Kyung Chae, Changwon-si (KR); Yong Cheol Jin, Changwon-si (KR); Yoon Seob Eom, Changwon-si (KR); Sang Hun Kim, Changwon-si (KR); Sung Min Ye, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 13/144,045

(22) PCT Filed: Jan. 11, 2010

(86) PCT No.: PCT/KR2010/000161
§ 371 (c)(1),
(2), (4) Date: Jul. 11, 2011

(87) PCT Pub. No.: WO2010/080005
PCT Pub. Date: Jul. 15, 2010

(65) Prior Publication Data
US 2012/0011660 A1 Jan. 19, 2012

(30) Foreign Application Priority Data

Jan. 9, 2009 (KR) .................. 10-2009-0001812

(51) Int. Cl.
*D06F 35/00* (2006.01)
*D06F 39/00* (2006.01)
*D06F 33/02* (2006.01)
*D06F 39/08* (2006.01)
*D06F 39/10* (2006.01)

(52) U.S. Cl.
CPC .............. *D06F 39/006* (2013.01); *D06F 33/02* (2013.01); *D06F 35/006* (2013.01); *D06F 39/083* (2013.01); *D06F 39/10* (2013.01); *Y02B 40/56* (2013.01)

(58) Field of Classification Search
CPC ..... D06F 33/02; D06F 35/006; D06F 39/083; D06F 39/10; D06F 39/006
USPC ........ 68/12.13, 12.19, 18 R, 18 F; 8/158, 159
See application file for complete search history.

(56) References Cited

U.S. PATENT DOCUMENTS 3,170,314 A * 2/1965 Worst ........................... 68/12.13
5,285,665 A * 2/1994 Hetrick, Jr. ................... 68/18 F
2003/0213069 A1* 11/2003 Tortorici et al. .................. 8/158

FOREIGN PATENT DOCUMENTS

| CN | 1132283 A | 10/1996 |
| CN | 101205089 A | 6/2008 |
| CN | 101705596 A | 5/2010 |
| DE | 40 23 024 A1 | 1/1992 |
| DE | 19710078 A1 | 11/1997 |

(Continued)

OTHER PUBLICATIONS

Machine Translation of Kuroki, JP 08-299683, Nov. 1996.*

(Continued)

*Primary Examiner* — David Cormier
(74) *Attorney, Agent, or Firm* — Ked & Associates, LLP

(57) ABSTRACT

A washing machine and a control method thereof are disclosed. The present invention relates to a washing machine, more specifically, to a washing machine that is able to the amount of rinsing water used in a rinsing course.

10 Claims, 4 Drawing Sheets

(56) References Cited

FOREIGN PATENT DOCUMENTS

| | | |
|---|---|---|
| EP | 0 735 179 A1 | 10/1996 |
| EP | 0 778 367 A1 | 6/1997 |
| EP | 1 944 403 A2 | 7/2008 |
| GB | 426019 A | 3/1935 |
| GB | 1 401 426 A | 7/1975 |
| JP | 08-299683 A | 11/1996 |
| JP | 09-173689 A | 7/1997 |
| JP | 2001-113080 A | 4/2001 |
| KR | 10-1998-0084162 A | 12/1998 |
| KR | 10-0200778 B1 | 6/1999 |

OTHER PUBLICATIONS

International Search Report dated Oct. 1, 2012 issued in Application No. PCT/KR2010/000161.
Korean Notice of Allowance dated Feb. 28, 2011 issued in Application No. 10-2009-0001812.
Chinese Office Action dated Oct. 24, 2014 issued in Application No. 201080010233.X (Original Office Action and English Translation).
European Search Report dated Nov. 21, 2013 for corresponding Application No. 10729347.4.
Chinese Office Action dated Jul. 7, 2015 issued in Application No. 201080010233.X (with English translation).

* cited by examiner

WASHING MACHINE AND CONTROL METHOD THEREOF

CROSS-REFERENCE TO RELATED PATENT APPLICATIONS

This application is a U.S. National Stage Application under 35 U.S.C. §371 of PCT Application No. PCT/KR2010/000161, filed Jan. 11, 2010, which claims priority to Korean Patent Application No. 10-2009-0001812, filed Jan. 9, 2009, whose entire disclosures are hereby incorporated by reference.

TECHNICAL FIELD

The present invention relates to a washing machine and a control method of the washing machine, more specifically, to a washing machine that is able to the amount of rinsing water used in a rinsing course.

BACKGROUND ART

Washing machines are electric appliances that perform a washing, rinsing and drying course and washing machines include washers, dryers and washers having a drying function.

Such a washing machine may be categorized into a drum type washing machine and a pulsator type, in other words, upright type washing machine In the pulsator type washing machine, a large amount of water is supplied to tub vertically provided in a cabinet defining an exterior appearance of the washing machine and a pulsator rotatably provided in the tub is rotated to generate friction between laundry water currents to perform washing. In the drum type washing machine, laundry is loaded in a drum horizontally provided in the cabinet, in parallel to a lower surface of the cabinet, and wash water is supplied to the drum to be rotated together with the laundry, such that washing is performed by dropped laundry, friction between the laundry and the drum and friction between the laundry and water currents.

Such the washing machine includes a washing course to remove dirt from the laundry, a rinsing course to remove remains of detergent used in the washing course and remaining dirt, a dry-spinning course to spin the laundry having washed and rinsed and a drying course to dry the laundry.

In the rinsing course, rinsing water used in rinsing the laundry is supplied and drained repeatedly to remove contaminants and remaining detergent from the laundry.

DISCLOSURE

Technical Problem

According to the conventional washing machine, the rinsing course repeating the supply and drainage of the rinsing water requires too much rinsing water disadvantageously. As a result, the present invention is invented to solve the above problem and an object of the present invention is to provide a washing machine and a control method of the washing machine that is able to minimize consumption of rinsing water required in the rinsing course.

Technical Solution

To achieve these objects, a control method of a washing machine includes an initial rinsing course to rinse laundry; a filtering step to filter rinsing water used in the rinsing course; and an auxiliary rinsing course to rinse the laundry by using the rinsing water filtered in the filtering step.

The auxiliary rinsing course may include at least two courses.

The initial rinsing course and each of the auxiliary rinsing courses may include a rinsing water supplying step to supply the rinsing water to a tub; and a rinsing water discharging step to discharge the rinsing water used in the initial rinsing course and the auxiliary rinsing courses outside the tub.

The control method of the washing machine may further include a determining step performed posterior to the rinsing water discharging step, the determining step to determine whether the discharged rinsing water is from a final auxiliary rinsing course.

The determining step may include a total sum of the number of the performed initial rinsing course and the number of the performed auxiliary rinsing courses with the predetermined number of the rinsing course performance to determine whether the discharged rinsing water is from the final auxiliary rinsing course.

The control method of the washing machine may further include a draining step to discharge the rinsing water outside a cabinet without the filtering step, if it is determined based on the result of the determining step that the discharged rinsing water is from the final auxiliary rinsing course.

The control method of the washing machine may further include a contamination level measuring step to measure a contamination level of the rinsing water, the contamination level measuring step performed posterior to the initial rinsing course.

The control method of the washing machine may further include a contamination level comparing step to determine whether the measured contamination level of the rinsing water is a predetermined reference contamination level or higher, the contamination level performed posterior to the contamination level measuring step, wherein if the measured contamination level is below the reference contamination level, the filtering step is performed.

The control method of the washing machine may further include a draining step to drain the rinsing water if the measured contamination level is the reference contamination level or higher, wherein the auxiliary rinsing courses follow the draining step.

The auxiliary rinsing course may include at least two auxiliary rinsing course and the control method may further include a determining step to determine whether the rinsing water is discharged from a final auxiliary of the at least two auxiliary rinsing courses.

In another aspect of the present invention, a washing machine includes a tub to hold rinsing water; a drum rotatably provided in the tub; a pump to discharge the rinsing water held in the tub outside the tub; a circulation pipe to discharge the rinsing water outside the tub and to circulate the discharged rinsing water to an upper portion of the tub, while the drum is driven; a supply pipe to discharge the rinsing water outside the tub and to re-supply the discharged rinsing water to the tub; and a filter provided in the supply pipe to filter the rinsing water.

The washing machine may further include a cabinet to secure the tub thereto; and a drain pipe to discharge the rinsing water discharged from the tub outside the cabinet.

The washing machine may further include a valve that is able to open the supply pipe and the circulation pipe selectively.

The washing machine may further include a valve that is able to open the supply pipe, the circulation pipe and the drain pipe selectively.

The washing may further include a sensor to measure a contamination level of the rinsing water held in the tub.

Advantageous Effects

The present invention has a following advantageous effect. According to the washing machine and the control method thereof, the amount of rinsing water required in the entire rinsing course may be minimized.

DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE

Figure 1:
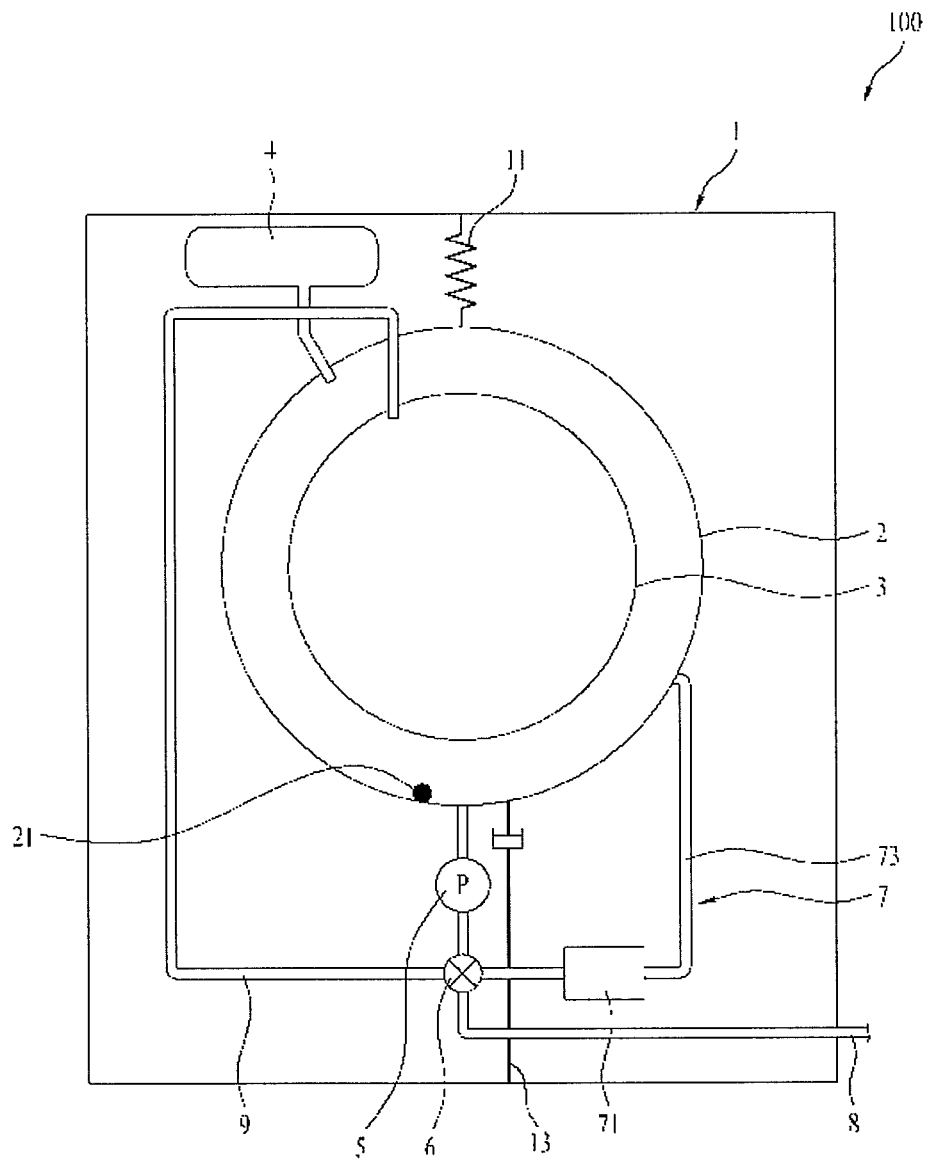
FIG. 1 is a conceptual diagram illustrating a washing machine according to an exemplary embodiment of the present invention.

Reference will now be made in detail to the specific embodiments of the present invention, examples of which are illustrated in the accompanying drawings. Wherever possible, the same reference numbers will be used throughout the drawings to refer to the same or like parts. FIG. 1 is a sectional view illustrating a concept of a washing machine according to an exemplary embodiment of the present invention.

In reference to FIG. 1, the washing machine according to the embodiment will be described and the washing machine 100 includes a cabinet 1, a tub 2, a drum 3, a rinsing water supply part 4, a pump 5, a valve 6, a filter part 7, a drain pipe 8, a circulation pipe 9, a control part (not shown). The cabinet 1 defines an exterior appearance of the washing machine. The tub 2 is provided in the cabinet 1 and the drum 3 is rotatably provided in the tub 2. The rinsing water supply part 4 supplies rinsing water to the tub and the pump 5 discharges the rinsing water held in the tub 2. The valve determines a path of the rinsing water supplied by the pump 5. The filter part 7 filters the rinsing water supplied by the pump 7. The drain pipe 8 discharges the rinsing water supplied by the pump 5 outside the cabinet 1. The circulation pipe 9 re-supplies the rinsing water supplied by the pump 5 to the tub 2. The control part (not shown) controls the valve 6.

The cabinet 1 defining the exterior appearance of the washing machine 100 receives the tub 2, which will be described later, therein. The cabinet 1 may include a spring 11 and a damper 13 to mount the tub thereto. The spring 11 has an end connected to the cabinet 1 and the other end connected to an upper surface of the tub 2 such that the tub may be hung on the cabinet 1. The damper 13 has an end connected to a lower surface of the tub 2 and the other end connected to a lower surface of the cabinet 1 such that the tub 2 may be located inside the cabinet 1. Here, the spring 11 and the damper 13 may absorb vibration generated in the tub during the washing and plural springs and dampers may be provided to embody this function.

The tub 2 is located in the cabinet by the spring 11 and the damper 13 and it holds rinsing water required in the washing and rinsing. The washing machine according to the present invention may include a sensor 21 that is able to measure a contamination level of the wash water held in the tub 2.

The sensor 21 may measure the contamination level of the rinsing water used in the rinsing of the laundry and various types of sensors may be adapted only if the above effect is expectable. For example, the sensor 21 may be an optical sensor 21 that can measure the contamination level based on a degree of reflection of lights with respect to the contaminants contained in the laundry. The drum 3 is rotatable in the tub 2 and the laundry is loaded into the drum 3. the drum 3 may include a plurality of through holes (not shown) to draw and discharge the rinsing water held in the tub 2 there through such that the rinsing water held in the tub 2 may be drawn into the drum 3 to contact with the laundry. Once the drum 3 is rotated, the laundry inside the drum 3 generates friction with the rinsing water and with an inner circumferential surface of the drum such that the washing may be performed.

The rinsing water supply part 4 is provided in the cabinet 1 to supply the rinsing water to the tub 2. as a result, the rinsing water supply part 4 may have an end extended to the outside of the cabinet to enable the rinsing water supplied from an external water supply source and the other end connected to an upper portion of the tub 2 to supply the rinsing water to the tub 2.

The pump 5 is employed to discharge the rinsing water held in the tub 2 outside the tub 2. As a result, the pump 5 may have an end connected to the lower surface of the tub 2 and the other end thereof in communication with the valve 6, which will be described later.

While the rinsing course is performed in the washing machine having the above configuration, supply and drainage of the rinsing water may be repeated and too much rinsing water is consumed disadvantageously. To solve the problem, the washing machine according to this embodiment may include the valve 6 and the filter part 7 to minimize the amount of the rinsing water required in the rinsing course.

Figure 2:
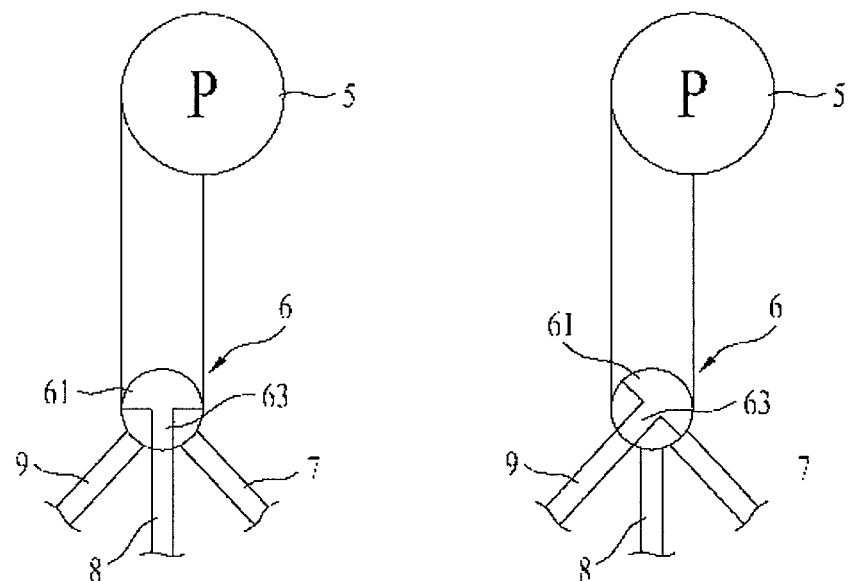
FIG. 2 is a diagram illustrating an example of a control valve.

FIG. 2 is a conceptual diagram illustrating the valve 6 of the washing machine. In reference to FIG. 2, the valve 6 will be described as follows. The valve 6 controls a path to supply the rinsing water supplied by the pump 5 to the filter part 7, the drain pipe 8 or the circulation pipe 9 selectively. As a result, the valve 6 may have an end connected to the pump 5 and the other end in communication with the filter part 7, the drain pipe 8 and the circulation pipe 9.

An example of the valve 6 to embody the above function will be described in reference to FIG. 2. The valve 6 includes an inlet 61 to draw the rinsing water supplied by the pump 5 therein and an outlet 63 to discharge the rinsing water drawn into the inlet 61.

The inlet 61 may be provided in a semicircle shape not to interfere with the drawing of the rinsing water supplied by the pump 9, even when the valve 6 is rotated rightward and leftward as shown in the drawing. The outlet 63 may be in communication with the inlet 61 to supply the rinsing water drawn into the inlet 61 to the filter part 7, the drain pipe 8 or the circulation pipe 9 according to the rotation of the valve 6. As a result, the control part (C), which will be described later, controls rotational angles of the valve 6 such that the rinsing water may be supplied to each of the filter part 7, the drain pipe 8 and the circulation pipe 9. Here, the structure of the valve 6 is only an example and the present invention is not limited thereto. People skilled in the art may adapt diverse types of valves having diverse structures only if they can embody the above function.

In reference to FIG. 1, the filter part 7 of the washing machine according to the present invention will be described. The filter part 7 filters the rinsing water discharged outside the tub after used in an initial rinsing course of the washing machine having a rinsing course performed at least two times, including an initial rinsing course and an auxiliary rinsing course. After that, the filter part supplies the filtered water as rinsing water which will be used in the auxiliary rinsing course. for that, the filter part 7 may include a supply pipe 73 having an end connected to the valve 6 and the other end connected to a side or lower surface of the tub 2, and a filter 71 provided in the supply pipe 73 to filter the rinsing water. According to the washing machine having the above configuration, the rinsing water supplied for the initial rinsing course is re-used as rinsing water for the auxiliary rinsing course. As a result, the problem of the too much rinsing water consumed in the conventional rinsing course may be solved according to the washing machine of the present invention.

The supply pipe 73 of the filter part may be similarly corresponding to the circulation pipe 9 which will be described layer. However, the circulation pipe 9, which will be described later, supplies rinsing water over the laundry during the operation of the rinsing course to enhance rinsing efficiency of the washing machine. Because of that, the rinsing water has to be supplied continuously during the operation of the rinsing course. Here, if the filter is provided in the circulation pipe 9, unnecessary filtering will be performed because the rinsing water having passed the filter is supplied over the laundry continuously during the operation of the rinsing course. In addition, the filter has to be exchanged quite often because of the unnecessary filtering. This differentiates the circulation pipe from the supply pipe 73.

That is, the supply pipe 73 filters only the rinsing water discharged from the initial rinsing course to be supplied and used in the auxiliary rinsing course, such that unnecessary filtering may not occur and that there may be no possibility of contamination caused in the filter because of the unnecessary filtering. This is different from the circulation pipe which will be described later. As follows, the drain pipe 8 and the circulation pipe 9 will be described in reference to FIG. 1. The drain pipe 9 forms a path to discharge the rinsing water drawn by the valve 6 outside the cabinet 1. For that, the drain pipe 9 may have an end connected to the valve 6 and the other end in communication with the outside of the cabinet 1.

The circulation pipe 9 is employed to re-supply the rinsing water drawn by the valve 6 to the tub 1. While the rinsing course is performed, the circulation pipe 9 supplies the rinsing water held in the tub 2 to the laundry inside the drum 3, over the laundry. This configuration may induce an effect of striking washing similar to hading washing that strikes the laundry with a bat to remove the contaminants from the laundry, such that rinsing efficiency of the washing machine may be enhanced. As a result, the circulation pipe 9 may have an end connected to the valve 6 to make the rinsing water drawn into the valve 6 and the other end connected to an upper portion of the tub 2 to make the rinsing water fall from an upper portion of the drum 3 to the laundry.

The difference between the supply pipe 73 and the circulation pipe 9 is that the supply pipe 73 induces the rinsing water to flow before the auxiliary rinsing course starts once the initial rinsing course is complete and that the circulation pipe 9 supplied the rinsing water to the inside of the drum during the rinsing course. While the circulation pipe 9 is connected to the upper portion of the tub 2 to fall the rinsing water toward the laundry, the supply pipe 73 has no limitation of its position.

Figure 3:
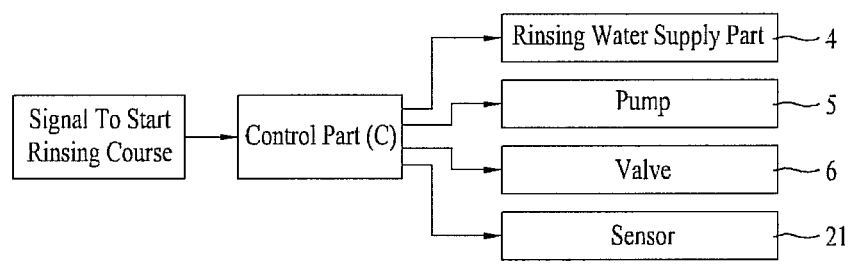
FIG. 3 is a conceptual diagram illustrating a control part.

FIG. 3 is a diagram illustrating the control part of the washing machine according to the present invention, In reference to FIG. 3, the control part will be described. The control part (C) receives an input signal to start the rinsing course. If the signal to start the rinsing course is inputted in the control part (C), the control part (C) controls the rinsing water required in the rinsing course to be supplied to the tub 2 via the rinsing water supply part 4.

Once the rinsing water is supplied to the tub 2 via the rinsing water supply part 4, the initial rinsing course is performed. At this time, the control part (C) controls the valve 6 to discharge the rinsing water held in the tub 2 and to fall toward the laundry from the upper portion of the drum 3 via the pump 5 and the circulation pipe 9.

Once the initial rinsing course is complete, the control part (C) controls the pump 5 and the valve 6 to draw the rinsing water discharged from the initial rinsing course into the filter part 7. Once the auxiliary rinsing course following the initial rinsing course is complete, the control part (C) controls the valve 6 to discharge the rinsing water held in the tub 2 to the drain pipe 8.

In addition, the control part (C) controls the sensor 21 to measure the contamination level of the rinsing water held in the tub 2 after the initial rinsing course is complete.

Figure 4:
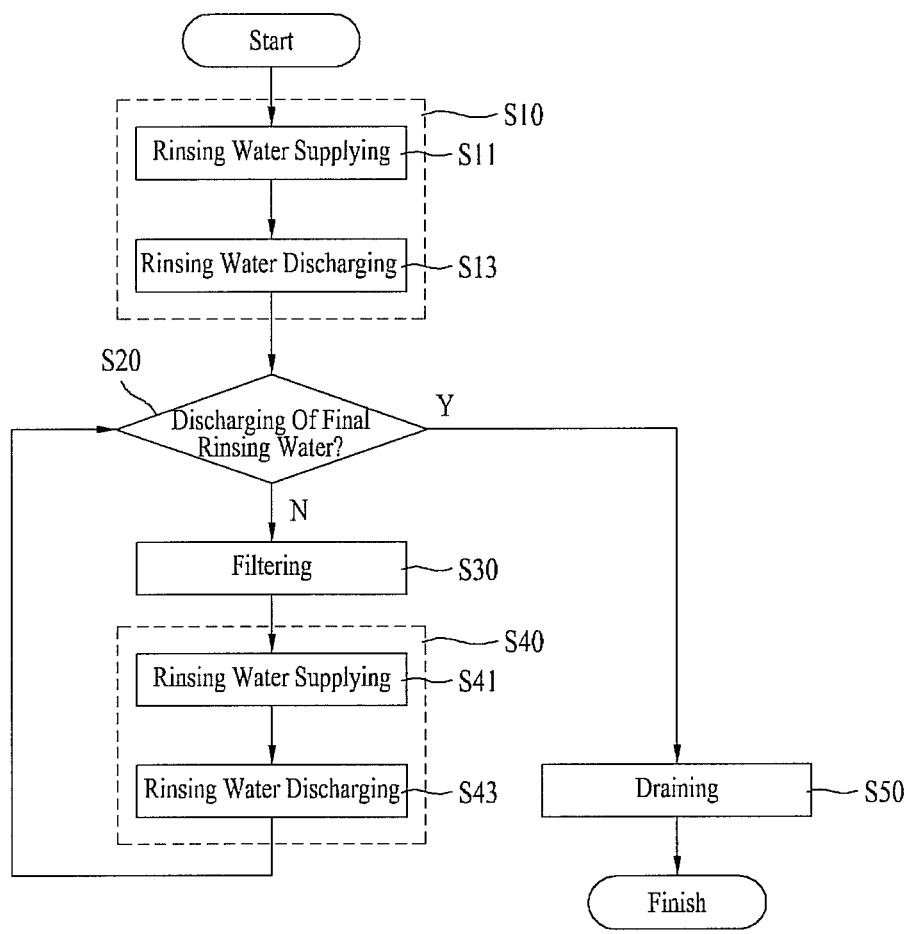
FIG. 4 is a flow chart illustrating a control method of the washing machine according to an exemplary embodiment of the present invention.

FIG. 4 is a flow chart illustrating a control method of the washing machine according to an exemplary embodiment of the present invention.

According to this embodiment, the rinsing course performed at least two times is provided and the rinsing course may be classified based on the performance order into the initial rinsing course and the final rinsing course. For explanation convenience sake, the washing machine includes the rinsing course performed two times.

If a signal to start the initial rinsing course is inputted in the control part (C, see FIG. 3), the control part (C) controls the rinsing water supply part (4, see FIG. 1) to perform a rinsing water supplying step (S11) supplying the rinsing water which will be used in the initial rinsing course (S10) to the tub (2, see FIG. 1). Once the rinsing water supplying step (S11) is complete, a drum driving step (not shown) is performed to rotate or agitate the drum to remove detergent and contaminants remaining the laundry by using the rinsing water supplied to the tub.

Once the drum driving step is complete, a rinsing water discharging step (S 13) is performed to discharge the rinsing water stored in the tub.

Once the rinsing water discharging step (S13) is complete, a determining step (S20) is performed according to the control method of the washing machine to determine whether the rinsing water is discharged in the final rinsing course. In the auxiliary rinsing course performed right after the initial rinsing course, the rinsing water filtered after discharged in the initial rinsing course has to be supplied. However, in case the more than two auxiliary rinsing courses are provided, the rinsing water discharged in the final rinsing course has to be discharged outside the cabinet.

Because of that, it is necessary to determine whether the discharged rinsing water is from the final rinsing course.

If it is determined that the discharged rinsing water is not from the final rinsing course, a filtering step (S30) is performed. The filtering step (S30) filters the rinsing water discharged outside the tub in the auxiliary rinsing courses except the initial and final rinsing courses by using the filter 71.

The rinsing water filtered in the filtering step (S30) is supplied to the laundry via the rinsing water supplying step (S41) of the auxiliary rinsing course (S40). Hence, the drum driving step mentioned above is performed. Once the drum driving step is complete, a rinsing water discharging step (S43) is performed to discharge the rinsing water used in the auxiliary rinsing course outside the tub.

If the rinsing water is discharged in the rinsing water discharging step (S43), it is re-determined via the determining step (S20) whether the discharged rinsing water is from the final rinsing course.

In case only the two auxiliary rinsing courses are provided as premised above, the determining step (S20) will determine that the discharged rinsing water is not from the final rinsing course and the auxiliary rinsing course is performed again via the identical steps described above to rinse the laundry.

Figure 5:
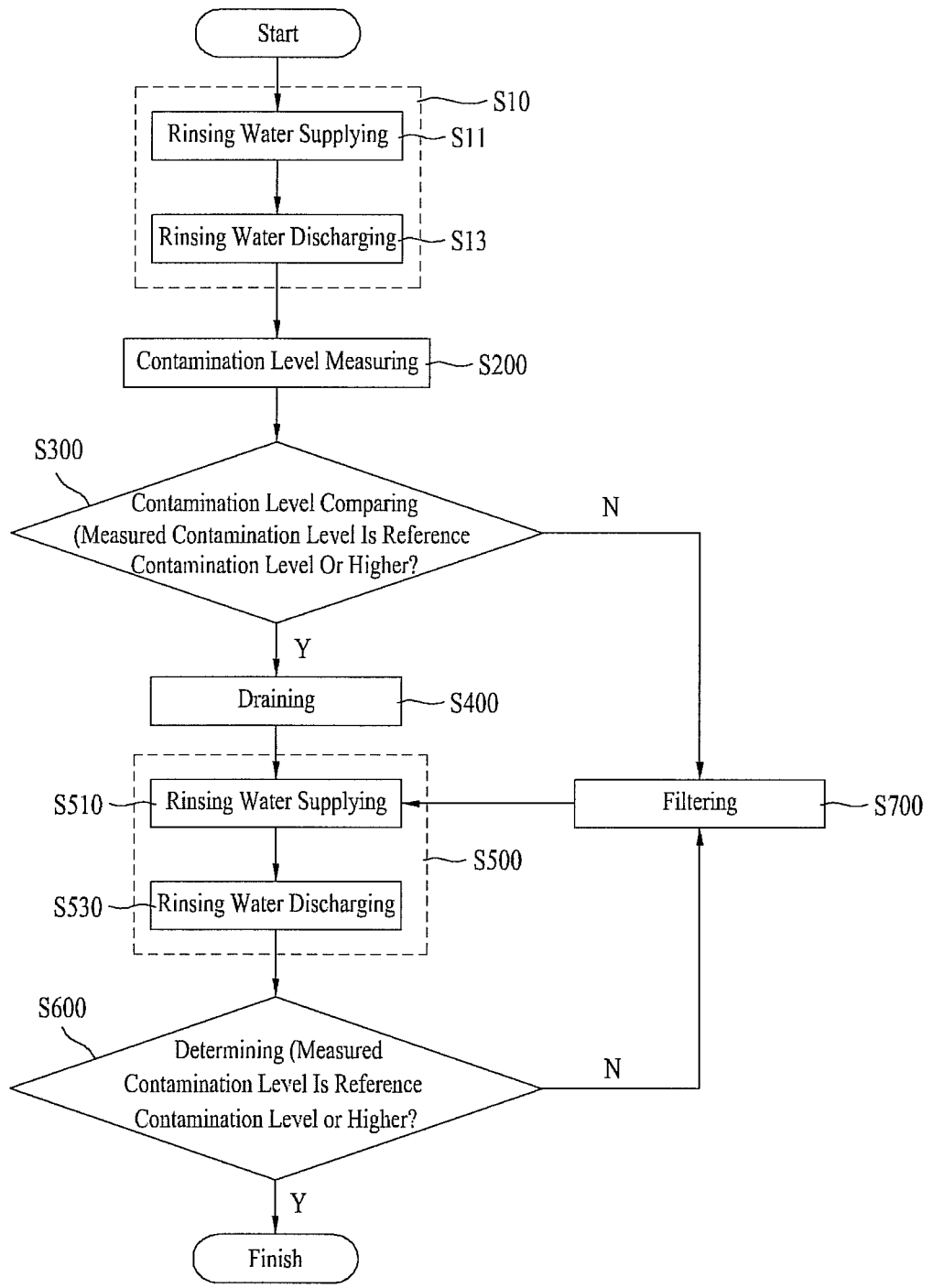
FIG. 5 is a flow chart illustrating a control method of the washing machine according to another embodiment of the present invention.

However, if it is determined based on the result of the determining step (S20) that the discharged rinsing water is from the final rinsing course, a draining step (S50) is performed to discharge the rinsing water outside the cabinet and then the control of the washing machine is complete. FIG. 5 is a flow chart illustrating a control method of the washing machine according to another embodiment of the present invention.

The control method according to another embodiment of the present invention include a contamination level measuring step (S200) and a contamination level comparing step (S300) additionally in comparison to the control method according to above embodiment in reference to FIG. 4. As follows, this embodiment is explained, focused on this difference. roles and effects of courses and steps according to this embodiment that use identical names of courses and steps according to the above embodiment in reference to FIG. 4 are identical to that of the courses and steps according to above embodiment.

According to this embodiment of the present invention, a contamination level measuring step (S200) is further provided to measure the contamination level of the rinsing water by using the sensor 21 and the contamination level measuring step (S200) is performed posterior to the initial rinsing course (S100) and the rinsing water discharging step (S130).

*The contamination level measuring step (S200) is a step to control the washing machine in case the discharged rinsing water cannot be used as rinsing water in the auxiliary rinsing course (S550) because of severe contamination of the laundry, even after filtered in the filtering step (S700) which will be described later.

That is, the contamination level measuring step (S200) measures a contamination level of the rinsing water stored in the tub 2 by using the sensor 21 and the contamination level comparing step (S300) performed posterior to the contamination level measuring step (S200) compares the measured contamination level with a reference contamination level.

If the measured contamination level is below the reference contamination level, the filtering step (S700) is performed. The rinsing water filtered in the filtering step (S700) is supplied to the tub 2 in the rinsing water supplying step (S510) of the auxiliary rinsing course (S500).

If it is determined based on the result of the contamination level comparing step (S300) that the measured contamination level is the reference contamination level or higher, a draining step (S400) is performed according to the control method of the washing machine to discharge the rinsing water outside the cabinet 1 via the drain pipe (8, see FIG. 1). This is because the rinsing water is not proper as rinsing water which will be used in the auxiliary rinsing course (S500). After the draining step (S400), the auxiliary rinsing course (S500) is performed and the auxiliary rinsing course (S500) includes a rinsing water supplying step (S510) to supply rinsing water to be used in the auxiliary rinsing course from the outside of the cabinet 1 via the rinsing water supply part (4, see FIG. 1).

Once the rinsing water supplying step (S510) of the auxiliary rinsing course (S500) is complete, the drum driving step (not shown) rinse the laundry and the rinsing water discharging step (S530) is performed to discharge the rinsing water used in the auxiliary rinsing course.

After the rinsing water discharging step (S530), it is preferable that the determining step (S600) is performed to determine whether the discharged rinsing water is from the final rinsing course (S500). As mentioned above, in case the auxiliary rinsing course performed two times or more is provided, the rinsing water discharged from the final rinsing course has to be discharged outside the cabinet without passing the filtering step (S700).

If it is determined that the discharged rinsing water is not from the final rinsing course, the filtering step (S700) is performed and then the rinsing water supplying step (S510) is performed to supply the rinsing water which will be used in the final rinsing course.

After the rinsing water discharged from the initial rinsing course (S 100) is filtered by the filter 71 of the filtering part 7, the filtered rinsing water is re-utilized as rinsing water required in the auxiliary rinsing course (S500). As a result, the amount of the rinsing water used in the rinsing course may be reduced. In addition, if the contamination level of the rinsing water used in the initial rinsing course is the reference contamination level or higher, the filtered rinsing water is not re-utilized as rinsing water for the auxiliary rinsing course. Because of that, rinsing efficiency deterioration may be prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A control method of a washing machine comprising a tub containing rinsing water, a drum rotatably provided in the tub, a pump to discharge rinsing water from the tub, a supply pipe guiding rinsing water out of the tub, a filter provided at the supply pipe to filter the rinsing water, a circulation pipe re-circulating rinsing water back to an upper portion of the tub, and a valve to control a flow of rinsing water from the pump to the supply pipe or the circulation pipe, the control method comprising:
   performing an initial rinsing course to rinse laundry;
   performing a filtering step to filter rinsing water used in the initial rinsing course after completion of the initial rinsing course using the supply pipe;
   performing an auxiliary rinsing course to rinse the laundry using the rinsing water filtered in the filtering course; and
   performing a circulation course during the initial rinsing course and the auxiliary rinsing course to circulate the rinsing water using the circulation pipe.

2. The control method of the washing machine as claimed in claim 1, wherein the auxiliary rinsing course comprises at least two courses.

3. The control method of the washing machine as claimed in claim 2, wherein the initial rinsing course and each of the auxiliary rinsing courses comprises:
   supplying rinsing water to the tub; and discharging the rinsing water used in the initial rinsing course and auxiliary rinsing courses outside the tub.

4. The control method of the washing machine as claimed in claim 3, wherein discharging the rinsing water used in the initial rinsing course and the auxiliary rinsing courses further comprises determining whether the discharged rinsing water is from a final auxiliary rinsing course when the rinsing water used in the auxiliary rinsing courses is discharged.

5. The control method of the washing machine as claimed in claim 4, wherein determining whether the discharged rinsing water is from a final auxiliary rinsing course comprises comparing a total sum of a number of initial and auxiliary rinsing courses performed with a predetermined number to determine whether the discharged rinsing water is from the final auxiliary rinsing course.

6. The control method of the washing machine as claimed in claim 4, further comprising:
   draining the rinsing water from the tub to an outside of a cabinet in which the tub is received when it is determined that the discharged rinsing water is from the final auxiliary rinsing course.

7. The control method of the washing machine as claimed in claim 1, further comprising:
   measuring a contamination level of the rinsing water after performing the initial rinsing course.

8. The control method of the washing machine as claimed in claim 7, further comprising:
   determining whether the measured contamination level of the rinsing water is greater than or equal to a predetermined reference contamination level after measuring the contamination level, and performing the filtering course when the measured contamination level is below the reference contamination level.

9. The control method of the washing machine as claimed in claim 8, further comprising:
   draining used rinsing water from the tub when the measured contamination level is greater than or equal to the reference contamination level, and performing the auxiliary rinsing courses after draining the used rinsing water from the tub.

10. The control method of the washing machine as claimed in claim 8, wherein the auxiliary rinsing course comprises at least two auxiliary rinsing courses, the control method further comprising:
    determining whether the rinsing water is discharged from a final auxiliary rinsing course of the at least two auxiliary rinsing courses.

* * * * *